US007551234B2

United States Patent
Zhou et al.

(10) Patent No.: US 7,551,234 B2
(45) Date of Patent: Jun. 23, 2009

(54) METHOD AND APPARATUS FOR ESTIMATING SHOT BOUNDARIES IN A DIGITAL VIDEO SEQUENCE

(75) Inventors: Hui Zhou, Toronto (CA); Alexander Sheung Lai Wong, Scarborough (CA)

(73) Assignee: Seiko Epson Corporation, Tokyo (JP)

( * ) Notice: Subject to any disclaimer, the term of this patent is extended or adjusted under 35 U.S.C. 154(b) by 652 days.

(21) Appl. No.: 11/191,458

(22) Filed: Jul. 28, 2005

(65) Prior Publication Data
US 2007/0025615 A1 Feb. 1, 2007

(51) Int. Cl.
    H04N 5/14 (2006.01)
(52) U.S. Cl. ..................................... 348/700
(58) Field of Classification Search ................ 382/270; 715/723; 348/700
    See application file for complete search history.

(56) References Cited

U.S. PATENT DOCUMENTS

| 5,911,008 | A |   | 6/1999  | Niikura et al. |
|-----------|---|---|---------|----------------|
| 5,990,980 | A | * | 11/1999 | Golin .......................... 348/700 |
| 6,195,458 | B1|   | 2/2001  | Warnick et al. |
| 6,373,979 | B1|   | 4/2002  | Wang |
| 6,393,054 | B1|   | 5/2002  | Altunbasak et al. |
| 6,643,387 | B1|   | 11/2003 | Sethuraman et al. |
| 6,690,725 | B1|   | 2/2004  | Abdeljaoud et al. |
| 6,721,454 | B1|   | 4/2004  | Qian et al. |
| 6,870,956 | B2| * | 3/2005  | Qi et al. ...................... 382/170 |
| 7,110,454 | B1| * | 9/2006  | Chakraborty .......... 375/240.16 |
| 7,113,640 | B2| * | 9/2006  | Qi et al. ....................... 382/170 |
| 7,310,589 | B2| * | 12/2007 | Li .............................. 702/179 |
| 7,372,991 | B2| * | 5/2008  | Chen et al. .................. 382/173 |
| 2001/0005430 | A1 |   | 6/2001  | Warnick et al. |
| 2003/0016240 | A1 |   | 1/2003  | Hanes |
| 2003/0058268 | A1 |   | 3/2003  | Loui et al. |
| 2004/0136460 | A1 |   | 7/2004  | Zhang et al. |
| 2004/0170321 | A1 |   | 9/2004  | Gong et al. |
| 2004/0205542 | A1 |   | 10/2004 | Bargeron et al. |
| 2005/0200762 | A1 | * | 9/2005  | Barletta et al. .............. 348/700 |
| 2007/0071318 | A1 | * | 3/2007  | Yamashita et al. .......... 382/169 |

OTHER PUBLICATIONS

Zhao et al., "Improving Color Based Video Shot Detection", 1999 p. 752-756.*
Zhang et al., "Automatic Partitioning of Full-motion Video", 1999, p. 10-28.*
Lu, "An Accumulation Algorithm for Video Shot Boundary Detection", 2004, p. 89-106.*
"Evaluating and Combining Digital Video Shot Boundary Detection Algorithms", Paul Browne, Alan F. Smeaton, Noel Murphy, Noel O'Connor, Sean Marlow, Catherine Berrut, Centre for Digital Video Processing, Dublin City University, (pp. 1-8), Proceedings of IMVIP 2000, Belfast, Northern Ireland, Sep. 2000.
"Shot Boundary Detection Using Temporal Statistics Modeling", Xiaoming Liu and Tsuhan Chen, Electrical and Computer Engineering, Carnegie Mellon University, Pittsburgh, IEEE International Conference on Acoustics, Speech, and Signal Processing 2002, pp. 3389-3392, vol. 4.
"A New Shot Boundary Detection Algorithm", Dong Zhang, Wei Qi, Hong Jiang Zhang, Microsoft Research, China, Proceedings of 2$^{nd}$ IEEE Pacific—Rim Conference on Multimedia (PCM 2001).
"Efficient Color Histogram Indexing for Quadratic Form Distance Functions", IEEE Transactions on Pattern Analysis and Machine Intelligence, vol. 17, No. 7., Jul. 1995, (pp. 729-736).

* cited by examiner

Primary Examiner—Vikkram Bali
Assistant Examiner—Soo Jin Park

(57) ABSTRACT

A method of estimating a shot boundary in a digital video sequence comprises calculating a measurement of dissimilarity between each frame in the video sequence and its previous frame based on at least one of de-emphasized luminance differences and absolute color differences. Each frame is tested against shot boundary dissimilarity thresholds using the dissimilarity measurement for the frame thereby to detect the shot boundary.

9 Claims, 5 Drawing Sheets

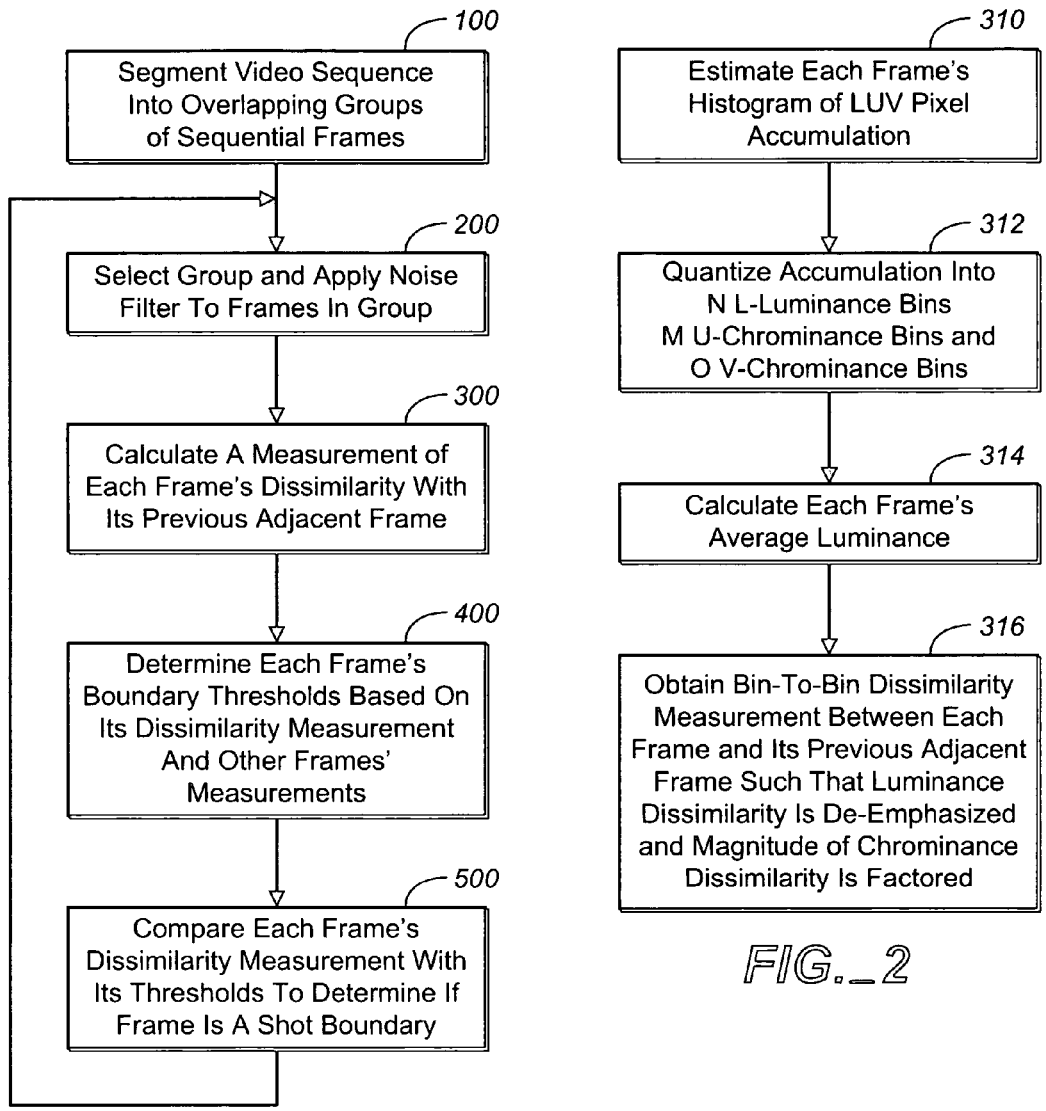
FIG._1
FIG._2

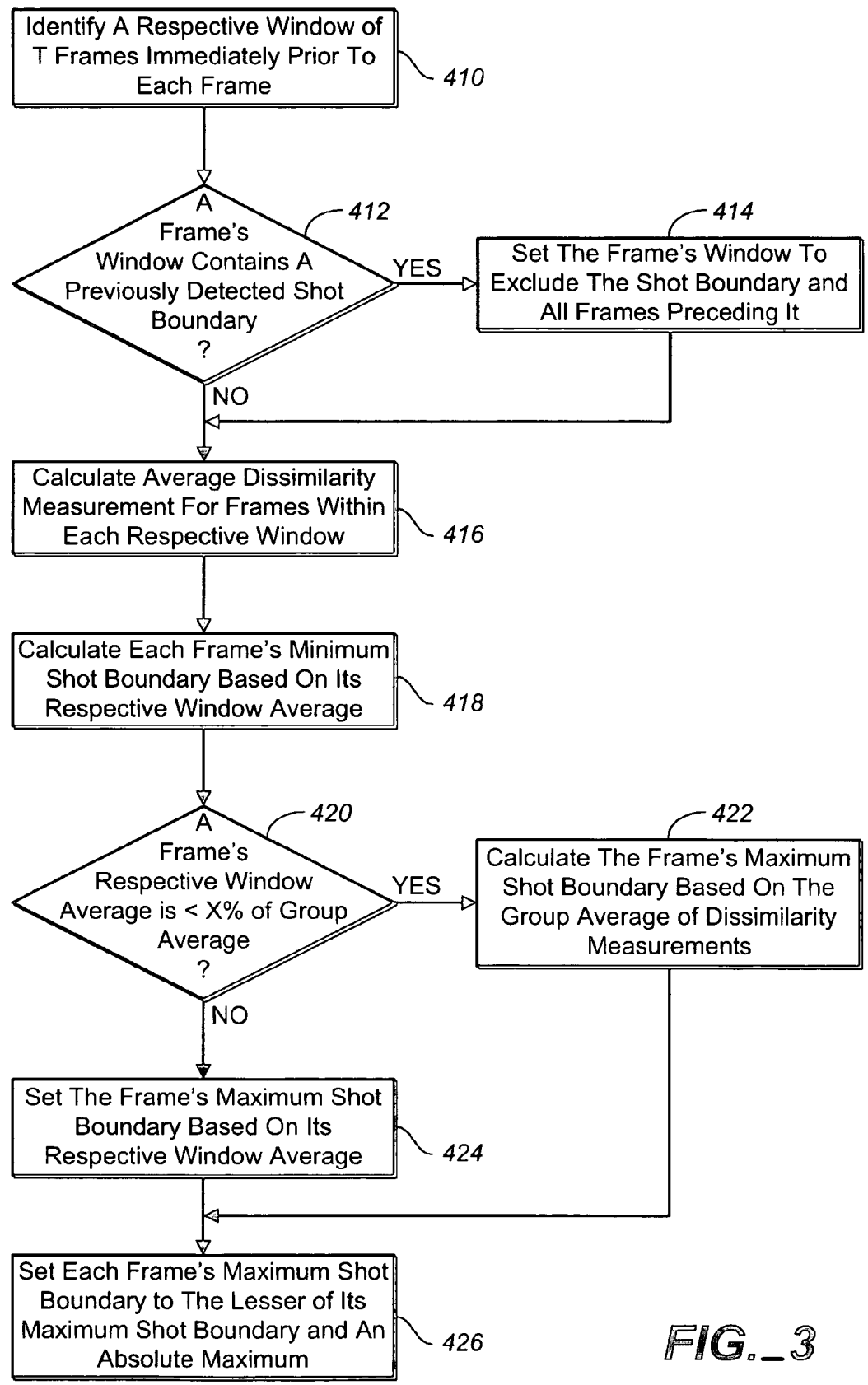
FIG._3

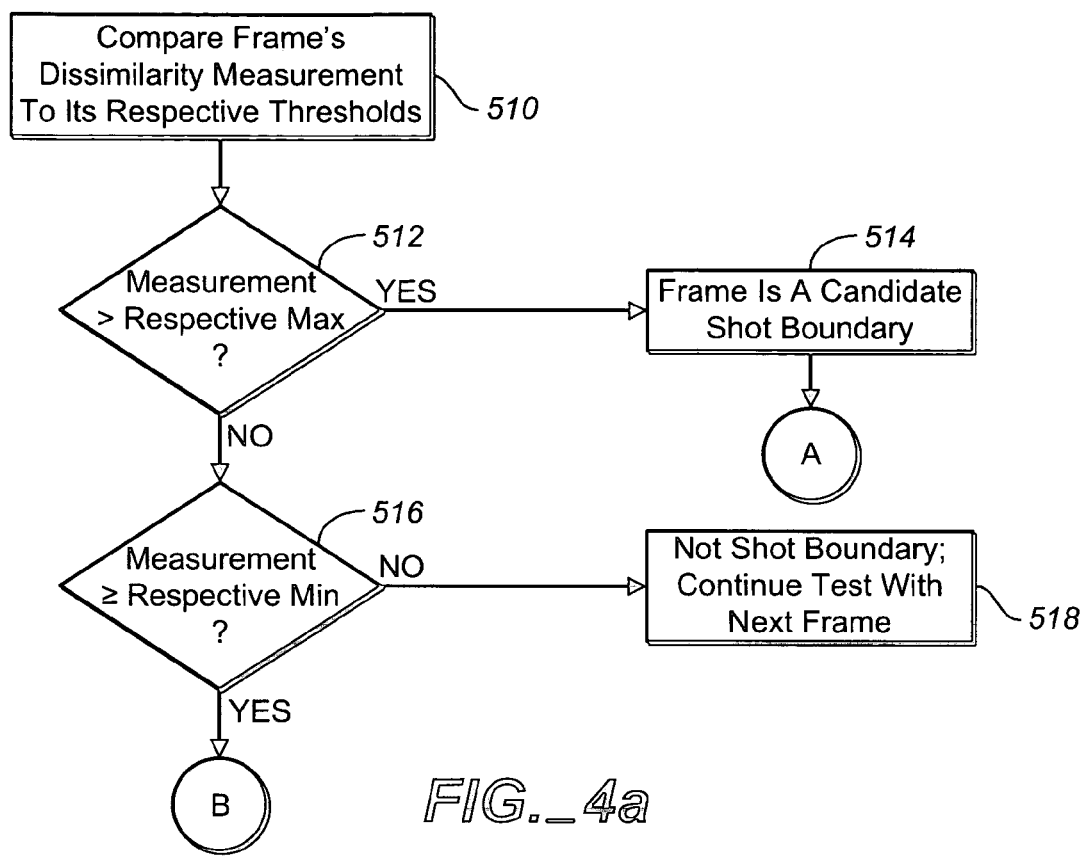

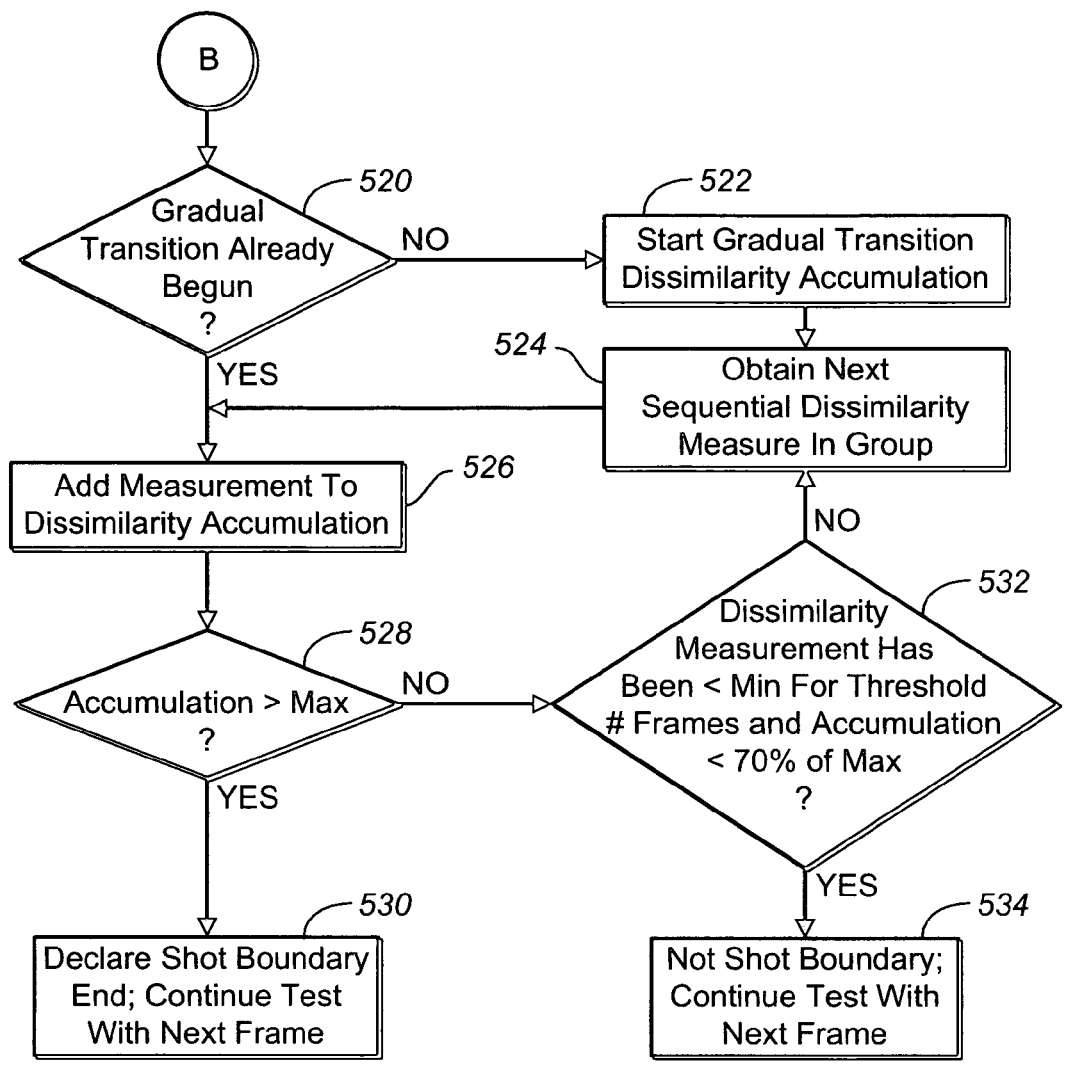
FIG._4b

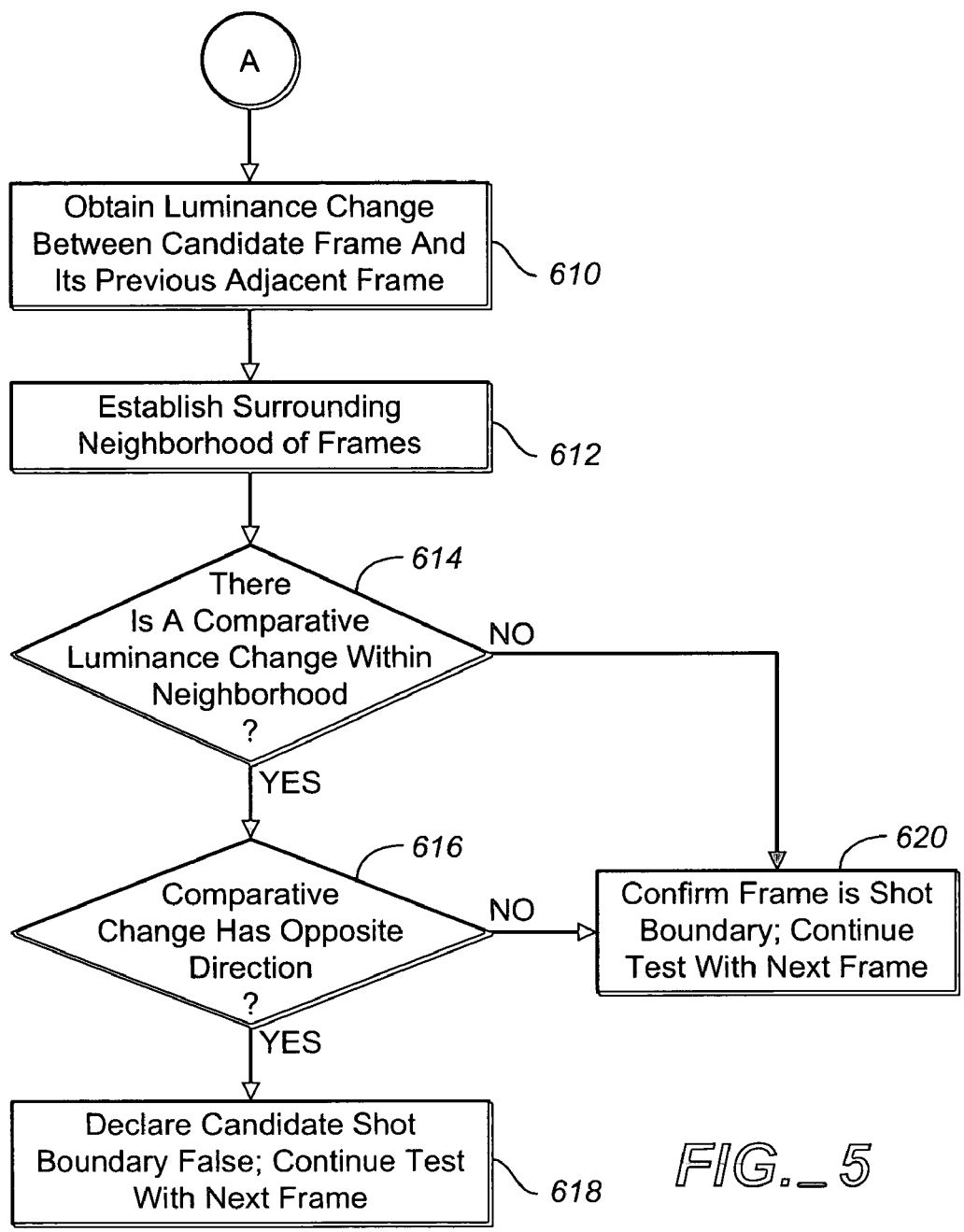
FIG._5

METHOD AND APPARATUS FOR ESTIMATING SHOT BOUNDARIES IN A DIGITAL VIDEO SEQUENCE

FIELD OF THE INVENTION

The present invention relates generally to processing of digital video and in particular, to a method and apparatus for estimating shot boundaries in a digital video sequence.

BACKGROUND OF THE INVENTION

In the art of digital video processing, a sequential group of video frames that appears to be captured from the same camera in a continuous or static fashion is known as a shot. Shot boundary detection is the process of identifying the frames that are at the boundaries of the individual shots into which a particular video sequence is segmented. Once identified by their boundaries, shots are usable for a number of practical video content retrieval and representation applications, including video storyboarding, video content searching and browsing, video analysis, and other applications.

Fundamentally, shot boundary estimation involves determining a level of dissimilarity between the content of adjacent frames in a video sequence and in the event that a determined level of dissimilarity exceeds a threshold, identifying the corresponding frames as the ending and beginning frames of respective shots.

Methods for estimating similarities between images are known. For example, U.S. Pat. No. 6,373,979 to Wang discloses a system and method for determining a level of similarity among more than one image. Anticipated spatial characteristics of an image are used for automatically identifying segments within the image and for identifying weights to be added to the color characteristics associated with the identified segments. To determine similarity, comparisons are made between weighted color characteristics of corresponding segments of different images. The identified segments have attributes such as size, position and number which are based on the anticipated spatial characteristics of the image. The anticipated spatial characteristics include, among other things, differences in image characteristics that are anticipated at relative positions within the image.

Methods of segmenting video for classification are also known. For example, U.S. Patent Application Publication No. US2004/0170321 to Gong et al. discloses a technique for video segmentation, classification and summarization based on singular value decomposition. Frames of an input video sequence are represented by vectors composed of concatenated histograms descriptive of the spatial distributions of colors within the video frames. The singular value decomposition maps these vectors into a refined feature space. In the refined feature space produced by the singular value decomposition, a metric is used to measure the amount of information contained in each video shot of the video sequence. The most static video shot is defined as an information unit and the content value computed from the shot is used as a threshold to cluster the remaining frames. The clustered frames are displayed using a set of static keyframes. The video segmentation technique relies on the distance between the frames in the refined feature space to calculate the similarity between frames in the video sequence. The video sequence is segmented based on the values of the calculated similarities. Average video attribute values in each segment are used in classifying the segments.

U.S. Pat. No. 6,195,458 and U.S. Patent Application Publication No. US2001/0005430 to Warnick et al. disclose methods for content-based temporal segmentation of video. A plurality of type-specific individual temporal segments within a video sequence is identified using a plurality of type-specific detectors. The plurality of type-specific individual temporal segments that are identified, are analyzed and refined. A list of locations within the video sequence of the identified type-specific individual temporal segments is output. A frame-to-frame color histogram difference metric is used to measure color similarities in adjacent frames. This is supported with a pixel difference metric to measure spatial similarity of adjacent frames. These processes are performed in parallel and the results are used to determine shot boundaries.

U.S. Pat. No. 5,911,008 to Niikura et al. discloses a scheme for estimating shot boundaries in compressed video data at high speed and accuracy. A predictive-picture (P-picture) change is calculated from a P-picture sequence in the input video data which is compressed by an inter-frame/inter-field forward direction prediction coding scheme, according to coded data contained in the P-picture sequence. An intra-picture (I-picture) change is calculated from an I-picture sequence in the input video data which is compressed by an intra-frame/intra-field coding scheme. A shot boundary is detected by evaluating both the P-picture change and the I-picture change.

U.S. Pat. No. 6,393,054 to Altunbasak et al. discloses a system for estimating a shot boundary in compressed video data without decompression. The content differences between frames are compared with thresholds to detect sharp or gradual shot boundaries. Keyframes are extracted from detected shots using an iterative algorithm.

While, as discussed above, there are known techniques for automatically estimating shot boundaries in a digital video sequence, improvements in accuracy and efficiency are desired. For example, a common shortfall with known methods for shot boundary estimation is that the chosen comparison technique for measuring dissimilarity between two frames does not accurately reflect the content differences of the frames. While known color comparison techniques, such as bin-to-bin absolute difference, chi-square histogram difference and the average color method proposed by Hafner, et al. in the publication entitled "Efficient Color Histogram Indexing for Quadratic Form Distance Functions", IEEE Transactions on Pattern Analysis Machine Intelligence., vol. 17, 1995 are sufficient, improvements are desired for more closely correlating dissimilarity measurements with true content differences.

Known color histogram difference comparison methods have also suffered as a result of inappropriate frame dissimilarity thresholds being selected during shot boundary identification. For example, selection of a single universal threshold tends to limit the effectiveness of shot boundary estimation to particular types of video sequence content (i.e. one of news, animation, or drama, etc.), because different content types inherently differ in the dissimilarity threshold levels that define respective shot boundaries. A related problem when using a universal threshold is that even within a video sequence of a particular type, content between shots can vary significantly. In order to address this problem, it has been proposed to continuously adapt the dissimilarity threshold frame by frame on the basis of the average inter-frame dissimilarity of frame pairs in a small window local to each frame. However, often any accuracy gains from this simple adaptive approach are lost due to fluctuating noise in a video sequence, or the side-effects of video compression.

Abrupt special effects that cause luminance anomalies in certain frames, such as those due to explosions and flashbulbs, are also known to cause false estimation of shot boundaries, particularly when color comparison methods are employed. In the publication entitled "A New Shot Boundary Detection Algorithm" authored by Zhang et al., Proceedings of $2^{nd}$ IEEE Pacific-Rim Conference on Multimedia (PCM 2001), a flashlight detector is integrated into a twin histogram shot boundary estimation algorithm. Flash effects are detected by finding the ratio between the average intensity difference of adjacent frames and the average intensity difference of a window of frames before and after the current frame. However, the flashlight detector tends to yield inconsistent results in situations where either sharp intensity fluctuations exist in a short sequence of frames, or a special effect lasts for several frames (i.e., long explosions, fireworks, and quick consecutive flashes).

As with many video processing techniques, a key concern with shot boundary estimation is performance. While many known techniques can provide accurate results in many situations, they have accordingly large computational and memory requirements. Examples of such computationally expensive algorithms are described in the publications entitled "Shot Boundary Detection Using Temporal Statistics Modeling", authored by Liu et al., IEEE International Conference on Acoustics, Speech, and Signal Processing 2002, pp. 3389-3392 vol. 4, 2002, and "Evaluating and Combining Digital Video Shot Boundary Detection Algorithms" authored by Browne et al., Proceedings of IMVIP 2000, Belfast, Northern Ireland, September 2000. As will be understood, for use in practical systems it is important for shot boundary estimation to balance accuracy and computational expense in a feasible manner.

It is therefore an object of the invention to provide a novel method and apparatus for estimating shot boundaries in a digital video sequence.

SUMMARY OF THE INVENTION

Accordingly, in one aspect there is provided a method of measuring dissimilarity between adjacent frames in a digital video sequence, comprising:

determining pixel accumulations at respective color component levels for each of said frames; and calculating a dissimilarity measurement by comparing corresponding ones of said accumulations and de-emphasizing dissimilarities in luminance between said frames.

In one embodiment, the color components are luminance and chrominance. The corresponding ones of the accumulations are common ranges of respective ones of luminance and chrominance. During the determining, LUV color-spaced histograms for the frames are generated and during the calculating, the LUV color-spaced histograms are compared.

According to another aspect there is provided a method of measuring dissimilarity between adjacent frames in a digital video sequence comprising:

determining pixel accumulations at respective color component levels for each of said frames; and calculating a dissimilarity measurement by comparing corresponding ones of said accumulations in a manner such that dominant color changes between said frames are emphasized.

In one embodiment, the color components are luminance and chrominance. The levels are ranges with each of the color components having a plurality of ranges. During the determining, LUV color-spaced histograms for the frames are generated and during the calculating, the LUV color-spaced histograms are compared.

According to another aspect there is provided a method of verifying a candidate shot boundary in a digital video sequence, comprising:

determining a first luminance change between said candidate shot boundary and its previous adjacent frame in the video sequence;

examining neighbourhood frames to determine if the luminance change between a neighbourhood frame and its previous adjacent frame in the video sequence is comparable to and in a direction opposite of said first luminance change; and declaring the candidate shot boundary as a false positive if the result of said examining is positive.

In one embodiment, the luminance change between a neighborhood frame and its previous adjacent frame is comparable to the first luminance change when the value thereof is within a threshold percentage of the first luminance change. During the examining, neighborhood frames before and after the candidate shot boundary are examined.

According to another aspect there is provided a method of determining a gradual shot transition in a digital video sequence comprising:

detecting a transition beginning when a dissimilarity measurement between adjacent frames in said sequence is between predetermined minimum and maximum thresholds;

forming an accumulated dissimilarity by accumulating dissimilarity measurements between adjacent frames subsequent to said transition beginning;

during said accumulating, in the event that there is a stall in accumulation, declaring said shot transition to be false; and otherwise detecting a transition ending when said accumulated dissimilarity exceeds said maximum threshold.

A stall occurs when dissimilarity measurements are less than a predetermined amount for a predetermined number of pairs of adjacent frames and the accumulated dissimilarity is less than a predetermined percentage of the maximum threshold.

According to another aspect there is provided a method of establishing a maximum shot boundary threshold for a candidate frame in a digital video sequence, comprising:

calculating a sequence average of inter-frame dissimilarity measurements; and calculating a window average of inter-frame dissimilarity measurements, said window comprising a subset of sequential frames in said sequence prior to said candidate frame;

in the event that said window average is inconsistent with said sequence average, calculating said maximum shot boundary as a factor of said sequence average; and otherwise calculating said maximum shot boundary as a factor of said window average.

In one embodiment, the window average is inconsistent with the sequence average when the sequence and window averages differ by more than a predetermined amount. The factor of the sequence average is a multiple of the sequence average and the factor of the window average is a multiple of the window average. If the window contains a previously estimated shot boundary, the window is adjusted in size to remove the previously estimated shot boundary and any frames prior to the previously estimated shot boundary.

According to yet another aspect of the present invention there is provided a method of estimating a shot boundary in a digital video sequence comprising:

calculating a measurement of dissimilarity between each frame in said video sequence and its previous frame based on at least one of de-emphasized luminance differences and absolute color differences; and testing each frame against shot boundary dissimilarity thresholds using the dissimilarity measurement for the frame thereby to detect a shot boundary.

In one embodiment, the calculating is based on both de-emphasized luminance differences and absolute color differences. During the calculating luminance and chrominance levels of the frames are quantized and compared. The quantization levels for luminance and chrominance are variable.

If desired, each detected shot boundary can be verified. Also, gradual shot transitions can be detected during the testing. The video sequence can be segmented into groups of sequential frames prior to the calculating and testing with the calculating and testing being performed independently for the frames of each group.

According to still yet another aspect of the present invention there is provided an apparatus for estimating a shot boundary in a digital video sequence comprising:

a dissimilarity calculator calculating a measurement of dissimilarity between each frame in the video sequence and its previous frame based on at least one of de-emphasized luminance differences and absolute color differences; and a comparator testing each frame against shot boundary dissimilarity thresholds using the dissimilarity measurement for the frame thereby to detect a shot boundary.

According to still yet another aspect of the present invention there is provided a computer readable medium embodying a computer program for estimating a shot boundary in a digital video sequence, said computer program comprising:

computer program code for calculating a measurement of dissimilarity between each frame in the video sequence and its previous frame based on at least one of de-emphasized luminance differences and absolute color differences; and computer program code for testing each frame against shot boundary dissimilarity thresholds using the dissimilarity measurement for the frame thereby to detect the shot boundary.

By reducing the relative contribution of luminance to measurements of inter-frame dissimilarity, dissimilarity measurements that are more closely attuned to true content dissimilarities are produced. As a result, the accuracy of shot boundary estimation is enhanced. Furthermore, by establishing a maximum shot boundary threshold for a particular frame based on an average inter-frame dissimilarity in a small window of frames local to the particular frame, the maximum shot boundary may be more accurately determined, thus yielding increased accuracy of shot boundary estimation. Also, by observing individual inter-frame intensity changes within a neighborhood of frames rather than average intensity changes, shot boundary estimation false positives due to luminance anomalies are reduced. Furthermore, because false gradual shot boundary transitions are detected, processing is more efficient. Further efficiencies are gained by processing smaller overlapping groups of sequential frames into which the video sequence is segmented.

BRIEF DESCRIPTION OF THE DRAWINGS

Embodiments will now be described more fully with reference to the accompanying drawings, in which:

FIG. 1 is a flowchart showing the general steps performed during estimation of a shot boundary in a digital video sequence;

FIG. 2 is a flowchart showing the steps performed during identification of the color components of pixels in the video sequence frames, and the calculation of a dissimilarity measurement between adjacent frames in the video sequence;

FIG. 3 is a flowchart showing the calculation of respective maximum and minimum shot boundary dissimilarity thresholds from the dissimilarity measurements;

FIGS. 4a and 4b are flowcharts showing the process for determining whether a frame is a shot boundary depending on its respective shot boundary thresholds; and FIG. 5 is a flowchart showing the steps performed during a luminance anomaly test process.

DETAILED DESCRIPTION OF THE EMBODIMENTS

With reference to FIG. 1, the general steps performed during estimation of a shot boundary in a digital video sequence are shown. In this embodiment, the digital video sequence is captured by a digital video recorder, or is the result of a conversion from film or other analog medium into a digital video format. The format may be MPEG-1 (Motion Pictures Experts Group—format 1), MPEG-2, Windows Media, AVI (Audio Video Interleave), Quicktime, RealMedia or any other digital video format, whether stored compressed or uncompressed. In this example, it is assumed that the digital video sequence is uncompressed or has been decompressed, and is therefore in the form of a sequence of video frames.

Initially, the digital video sequence is segmented into overlapping groups of sequential frames in order to reduce the amount of computer system memory (i.e. RAM or the like) required for processing the digital video sequence (step 100). During processing of a particular group of sequential frames, it is not required for the remaining groups of sequential frames to be stored in system memory. The group size may be chosen automatically or by a user based on the total length of the digital video sequence, and the available memory capacity of the computer system. For instance, a computer system having limited memory capacity could segment a video sequence into small groups in order to reduce the likelihood of time-consuming hard disk page swapping. In order to provide consistency between groups of sequential frames being processed, the last frame in a group becomes part of the next group in the sequence. That is, groups overlap by one frame. By employing overlapping frame groups, a balance is struck between system performance costs, consistency and accuracy.

With the video sequence segmented into overlapping groups, the first group of sequential frames is selected and a noise filter is applied to each frame in the group (step 200). In this example, the noise filter is a 4×4 box filter. As will be understood by one of ordinary skill in the art, noise in video sequence frames can unduly affect dissimilarity comparisons between frames. In particular, noise in one or both frames in a pair of adjacent frames can incorrectly yield a greater (or lesser) dissimilarity measurement than would a comparison between frames with no noise. Use of the noise filter reduces noise and therefore lessens its undesirable impact on dissimilarity measurements.

After noise filtering has been performed, a measurement of dissimilarity between each frame in the selected group and its previous adjacent frame is calculated (step 300). Using these inter-frame dissimilarity measurements, respective shot boundary dissimilarity thresholds are calculated for each frame in the selected group (step 400). Each frame is then tested against its respective boundary thresholds in order to determine if it is a shot boundary (step 500). Following this step, a check is made to determine if one or more unselected groups of sequential frames exist. If so, the next group of sequential frames is selected and steps 200 to 500 are repeated for that group of sequential frames. As will be appreciated, steps 200 to 500 are performed for each overlapping group of sequential frames.

FIG. 2 better illustrates the steps performed during calculation of the dissimilarity measurement between a candidate frame and its previous adjacent frame at step 300. First, a CIE LUV (referred to hereafter as, simply, LUV) color-space histogram for each frame in the pair is estimated (step 310). As will be understood, this color-space histogram plots accumulations of pixels having particular levels of luminance (L) and chrominance (U,V) components. The accumulations of pixels in each color-space histogram are then quantized into bins, or ranges, of luminance and chrominance levels (step 312). For example, pixels having a luminance component level within a first range are accumulated in the same bin as pixels having luminance values that, while different, are still within the same range. A predefined number of bins per component are chosen. In this example, the first N bins are allocated for luminance L, the next M bins are allocated for chrominance U, and the last O bins are allocated for chrominance V. The number of bins set aside for each component can be adjusted based on different situations where accuracy/performance trade-offs must be made allowing quantization levels for the color-space histograms to be varied.

The average luminance AY of each frame in the pair is then determined (step 314) using equation (1) below:

$$AY = \left(\sum_{i=1}^{bins} i * Y(i)\right) / \left(\sum_{i=1}^{bins} Y(i)\right) \quad (1)$$

where:

Y(i) is the number of pixels in the frame whose luminance value is located in bin i; and bins is the number of bins used for luminance L in the color-space histogram i.e. N bins.

The measurement of dissimilarity between the candidate frame and its previous adjacent frame is then calculated (step 316) using histogram differencing equation (2) below:

$$WID(h1, h2) = 1 - \frac{\sum_{i=1}^{bins} \min(h1[i], h2[i])}{X + \sum_{i=Lbins+1}^{bins} (\max(h1[i], h2[i]) + |h1[i] - h2[i]|)} \quad (2)$$

where:

h1[i] is the number of pixels whose color value is categorized by bin i in color-space histogram h1 estimated for the candidate frame;

h2[i] is the number of pixels whose color value is categorized by bin i in color-space histogram h2 estimated for the previous adjacent frame;

bins is the total number of bins allocated for each of the color-space histograms i.e. (N+M+O) bins;

X is the number of pixels in each frame; and

Lbins is the number of bins used for luminance L in the color-space histogram i.e. N bins.

This measurement is referred to as a measurement of frame dissimilarity or an inter-frame dissimilarity measurement. Bin-to-bin measurements of dissimilarity proposed in the past have afforded each of the color components equal weighting. Using histogram differencing equation (2) has been found to be advantageous for obtaining inter-frame dissimilarity measurements that better reflect content dissimilarities as compared to prior art techniques. Despite the importance of luminance for defining the structure of a frame, a luminance difference between frames does not directly correlate with true content dissimilarity. Therefore, in order to reduce the likelihood of false shot boundaries being detected as a result merely of luminance differences, histogram differencing equation (2) affords luminance a lower weight in the measure relative to the chrominance components. In effect, the impact of frame luminance differences is de-emphasized. The histogram differencing equation (2) also emphasizes dominant color changes between frames, which often indicates a shot boundary change. To achieve this, the normalized absolute color differences between the individual bins in the color-space histograms are factored into histogram differencing equation (2) by the |h1[i]−h2[i]| component. As can be seen, large dominant color changes between corresponding component levels in color-space histograms h1 and h2 (i.e. h1[i]>>h2[i] or h2[i]>>h1[i]) result in large dissimilarity measurements. For example, when one major color is in one frame and not the other, the color difference is emphasized.

As mentioned above, once the dissimilarity measurements based on a de-emphasized luminance difference and absolute color differences have been obtained for each frame in the group, shot boundary dissimilarity thresholds are determined for each frame (step 400). FIG. 3 better illustrates the steps performed during dissimilarity threshold determination for a candidate frame. Initially, a window of T frames leading up to the candidate frame is identified (step 410). The frames in the window are then examined to determine if a previously estimated shot boundary is within the window (step 412) If a previously estimated shot boundary is within the window, the window is truncated to exclude the previously estimated shot boundary frame and any frames preceding it (step 414). The truncation to remove the previously estimated shot boundary from the window reduces the effects of noise due to the shot boundary for subsequent processing as will be described below. The number of frames in the window is adjustable depending on the situation. It has been found by experiment that a window with a size of between about 10 and 20 frames (i.e., T=10~20) is sufficient for most types of video content. Use of windows with fewer frames tends to result in more false positive shot boundary estimations, and use of windows with more frames tends to result in missed estimations of shot boundaries.

On the basis of the dissimilarity measurements for each of the frames in the group, an average inter-frame dissimilarity measurement (ADM) is calculated for the window of frames (step 416).

A minimum shot boundary dissimilarity threshold, used to detect the start of a gradual shot transition, is then calculated for each frame based on the calculated average ADM. In this example, the minimum shot boundary dissimilarity threshold is set at 1.5 to 2 times the ADM (step 418). This factor has been determined on the basis of experimentation with several different types of video sequences. It has been found that a multiplication factor lower than 1.5 less tends to result in more false positive shot boundary estimations, and a multiplication factor greater than 2 tends to result in missed estimations of shot boundaries.

The maximum shot boundary dissimilarity threshold for each frame is then determined. During maximum shot boundary dissimilarity threshold determination for each frame, the average ADM of the frames within the window associated with the candidate frame ($ADM_{Frame\ Avg}$) is compared with the average ADM of the frames within the group ($ADM_{Group\ Avg}$) (step 420). If $ADM_{Frame\ Avg}$ is less than $ADM_{Group\ Avg}$ by more than a threshold amount, then the maximum shot boundary dissimilarity threshold of the candidate frame is based on $ADM_{Group\ Avg}$ (step 422). Otherwise, the maximum shot boundary dissimilarity threshold of the candidate frame is based on $ADM_{Frame\ Avg}$ for increased accuracy (step 424).

The ADM determination described above takes into account the distribution of frame dissimilarity measurements local to the particular frame for increased accuracy in shot boundary estimation. As a "fallback" position, however, it also takes into account the situation in which the local distribution data is not reliable for threshold selection, due to the local distribution data being inconsistent with the group distribution data. Such local and group distribution data inconsistencies could be the result of long stretches of identical frames within the video sequence. Without this "fallback" position, small changes between frames may be mistakenly indentified as a shot boundary.

The above-described determination of the maximum shot boundary dissimilarity threshold is expressed in pseudocode as follows:

IF $ADM_{Frame\ Avg}$ <X % of $ADM_{Group\ Avg}$ THEN
Max_threshold=min(Y*$ADM_{Group\ Avg}$, Tc)
ELSE
Max_threshold=min(Z*$ADM_{Frame\ Avg}$, Tc)

where:

ADM is the average pair-to-pair histogram dissimilarity measurement;

X is a pre-defined percentage of the ADM;

Y and Z are multiplication factors typically in the range of from about 4 to 6; and Tc is the absolute maximum shot boundary dissimilarity threshold that can be used. Values within the range of from about 0.7 to 0.9 have been determined by experiment to be appropriate.

By empirical experimentation, it has been found that setting the maximum shot boundary dissimilarity threshold based on X=50%, Y=4, Z=4.7, and Tc=0.75 provides good results when the accuracy of the method is compared to the observations of a human observer. As can be seen, this conditional adaptive threshold selection procedure serves to provide a balance between accuracy and consistency during shot boundary dissimilarity threshold selection.

In order to understand the advantages of the above-described maximum shot boundary dissimilarity threshold determination, consider a stretch of four sequential frames wherein the first three frames are identical due to encoding and the fourth frame is only slightly different from the first three frames i.e. it would not be considered by a human observer to be part of a different shot. In this case, should a window size of 3 be chosen, with only local window-based threshold selection, the fourth frame would be declared a shot boundary.

Once shot boundary dissimilarity thresholds for each frame in the group have been determined (step 400), each frame is tested against its respective shot boundary dissimilarity thresholds to determine if it is a shot boundary (step 500). FIG. 4a better illustrates the steps performed during this process. As can be seen, the measurement of inter-frame dissimilarity generated for each frame is compared to the shot boundary dissimilarity thresholds calculated for the frames (step 510). If the dissimilarity measurement exceeds the maximum shot boundary dissimilarity threshold (step 512), the frame is considered to be a candidate shot boundary (step 514). A special effects test procedure is then conducted to validate the candidate shot boundary and confirm that it is not a false positive as a result of a luminance anomaly, as will be described.

If the dissimilarity measurement does not exceed the maximum shot boundary dissimilarity threshold (step 512), and if the dissimilarity measurement does not at least equal the minimum shot boundary dissimilarity threshold (step 516), the candidate frame is deemed not to be a shot boundary and the procedure continues at step 510 with the next sequential frame in the group (step 518). If the dissimilarity measurement does not exceed the maximum shot boundary dissimilarity threshold and if the dissimilarity measurement exceeds the minimum shot boundary dissimilarity threshold, a check is made to determine if a gradual shot boundary transition is beginning (step 520).

Turning now to FIG. 4b, if at step 520 a gradual shot transition has already begun, the dissimilarity measurement for the candidate frame is added to an accumulated dissimilarity total (step 526). If a gradual shot transition has not already begun, an accumulated dissimilarity total is started (step 522). The dissimilarity measurement for the next sequential frame in the group is obtained (step 524) and added to the accumulated dissimilarity total (step 526).

At this point, the accumulated dissimilarity total is tested against the maximum shot boundary dissimilarity threshold of the candidate frame. If it exceeds the maximum shot boundary dissimilarity threshold (step 528), the gradual shot boundary transition is declared to have ended and the procedure continues at step 510 with the next sequential frame in the group (step 530).

If at step 528, the accumulated dissimilarity total does not exceed the maximum shot boundary dissimilarity threshold, the dissimilarity measurements are compared to the maximum shot boundary dissimilarity threshold. If the accumulated dissimilarity measurements are below the minimum shot boundary dissimilarity threshold of the candidate frame for a predetermined number of frames and the dissimilarity accumulation is less than 70% of the maximum shot boundary dissimilarity threshold of the candidate frame (step 532), the candidate frame is declared a false positive (step 534). Otherwise, processing continues at step 524 as described above. This detection of a "stall" in dissimilarity accumulation is an improvement upon known basic gradual transition detection algorithms as it allows false positives to be detected.

With reference to FIG. 5, the special effects test procedure utilizes a neighborhood of frames to evaluate whether the candidate shot boundary is a false positive. First, the average luminance change between the candidate shot boundary and its previous frame is obtained (step 610) as calculated in step 314. The neighborhood of frames comprising N frames previous to the candidate shot boundary and N frames after is then established (step 612). If another frame in the neighborhood exists whose average luminance change (also calculated in step 314) from its previous frame is comparable (within 30%; i.e., between 70% and 130% of the ADM of the candidate frame) (step 614) and the direction of change (that is, less to more OR vice-versa) is in the opposite direction (step 616), then the candidate shot boundary is declared a false positive and processing continues at step 510 with the next sequential frame in the group (step 618). However, in the event that there is no comparative luminance change within the neighborhood or there is one but it is in the same direction, then the candidate shot boundary is confirmed and processing continues at step 510 with the next subsequent frame in the group (step 620). By considering individual comparative inter-frame dissimilarity measurements in the window rather than their averages, special effects lasting for several frames can be detected.

An example of a false positive due to a special effect may arise in the situation where there are three sequential frames that a human observer would consider to be part of the same shot, and the second frame is noticeably brighter due to the capture of a flashbulb effect. In this case, the average luminance would significantly increase between the first and second frames, and significantly decrease between the second and third frames. In such circumstances prior art algorithms not employing a special effects test procedure would detect a shot boundary. In contrast, the special effects test procedure with an appropriate window would identify the second frame as a false shot boundary.

The above-described shot boundary estimation method may be embodied in a software application including computer executable instructions executed by a processing unit such as a personal computer or other computing system environment. The software application may run as a stand-alone digital image editing tool or may be incorporated into other available digital image editing applications to provide enhanced functionality to those digital image editing applications. The software application may include program modules including routines, programs, object components, data structures etc. and be embodied as computer readable program code stored on a computer readable medium. The computer readable medium is any data storage device that can store data, which can thereafter be read by a computer system. Examples of computer readable medium include for example read-only memory, random-access memory, CD-ROMs, magnetic tape and optical data storage devices. The computer readable program code can also be distributed over a network including coupled computer systems so that the computer readable program code is stored and executed in a distributed fashion.

A personal computer such as that employing a Pentium™ processor and running Microsoft Windows™ may be operated under control of the computer program, which may be written in Visual Basic, C++, Java or any higher or lower level language to carry out shot boundary estimation on a digital video sequence received from a video camera either directly or indirectly. Those of skill in the art will however appreciate that carrying out shot boundary estimation is not limited a particular type of computer. It will be understood that any suitable processor on any commercially-available device may be used.

Also, although the above-described shot boundary estimation implements novel dissimilarity measurement, luminance anomaly detection, gradual shot transition and shot boundary dissimilarity threshold calculation techniques, it will be appreciated by those of skill in the art that the above techniques can be used and implemented independently or in subsets.

For example, measuring dissimilarity between adjacent frames in a digital video sequence may be embodied in a dedicated apparatus that comprises a counter for determining the pixel accumulations, and a dissimilarity calculator for calculating dissimilarity between frames based on the accumulations in the manner described previously.

Similarly, determining that a candidate shot boundary identified in a digital video sequence is due to a luminance anomaly may be embodied in a dedicated apparatus that comprises a luminance change detector for detecting luminance changes between frames, and a luminance change comparator for comparing luminance changes between frames in the manner described previously.

Also, assessing a gradual shot transition in a digital video sequence may be embodied in a dedicated apparatus that comprises a transition beginning detector for detecting shot boundary transition beginnings, a dissimilarity accumulator for forming an accumulation of dissimilarities, a stall detector for detecting accumulation stalls, and a transition ending detector for detecting shot boundary transition endings in the manner described previously.

Further, establishing a maximum shot boundary dissimilarity threshold for a reference frame in a digital video sequence may be embodied in a dedicated apparatus that comprises a dissimilarity average calculator for calculating sequence and window averages of dissimilarity measurements, and a maximum shot boundary calculator for calculating the maximum shot boundary in the manner described previously.

While the digital video sequence is described as being segmented into groups of frames for efficiency and performance advantages, it will be understood that segmentation of the video sequence is not required. It will also be understood that while noise filtering is used, in some instances where noise is minimal, the absence of noise filtering will not unduly affect shot boundary estimation.

The particular ranges and factors described above have been determined through empirical experimentation to be advantageous to the accuracy of shot boundary estimation. However, adjustments to the ranges and factors such that they are different from those described will be understood to those of skill in the art to be design choices.

The CIE LUV color-space has been employed in the above example since it is one of the better color-spaces for ascertaining small color differences. Also advantageously, when colors are expressed in LUV color-space, luminance is a separate component thereby facilitating its de-weighting. Notwithstanding the above, those of skill in the art will appreciate that other color-spaces may be used.

Although embodiments have been described, those of skill in the art will appreciate that variations and modifications may be made without departing from the spirit and scope thereof as defined by the appended claims.

What is claimed is:

1. A method of measuring dissimilarity between adjacent frames in a digital video sequence, comprising:
  using a computer processing unit to perform the steps of:
  determining pixel accumulations at respective luminance and chrominance color component levels for each of said frames, wherein during said determining, LUV colorspace histograms for said frames are generated;
  calculating a dissimilarity measurement by comparing corresponding ones of said accumulations while de-emphasizing dissimilarities in luminance between said frames, wherein said corresponding ones of said accumulations are common ranges of respective ones of luminance and chrominance, and wherein during said calculating, said LUV color-space histograms are compared; and
  wherein said dissimilarity measurement is calculated according to the formula:

$$WID(h1, h2) = 1 - \frac{\sum_{i=1}^{bins} \min(h1[i], h2[i])}{X + \sum_{i=Lbins+1}^{bins} (\max(h1[i], h2[i]) + |h1[i] - h2[i]|)}$$

where:
  $h1[i]$ is the number of pixels whose color value is categorized by bin i in the LUV color-space histogram h1 determined for one of said frames;

h2[i] is the number of pixels whose color value is categorized by bin i in the LUV color-space histogram h2 for the other of said frames;

bins is a total number of bins used in the LUV color-space histograms;

X is the number of pixels in each of said frames; and

Lbins is a number of bins in each LUV color-space histograms used to store luminance accumulation levels.

2. A method of establishing a maximum shot boundary threshold for a candidate frame in a digital video sequence, comprising:

using a computer processing unit to perform the steps of:

calculating a sequence average of inter-frame dissimilarity measurements;

calculating a window average of inter-frame dissimilarity measurements, said window comprising a subset of sequential frames in said sequence prior to said candidate frame, said subset comprising a plurality of sequential frames;

in the event that said window average is inconsistent with said sequence average, calculating a maximum shot boundary threshold as a factor of said sequence average; and otherwise calculating said maximum shot boundary threshold as a factor of said window average; and wherein said maximum shot boundary threshold is calculated according to the pseudocode;

IF $ADM_{Frame\ Avg} < X\%$ of $ADM_{Group\ Avg}$ THEN
  Max threshold=min($Y*ADM_{Group\ Avg}$, Tc) ELSE
  Max threshold=min($Z*ADM_{Frame\ Avg}$, Tc) where:
ADM is an average pair-to-pair histogram dissimilarity measurement;
$ADM_{Frame\ Avg}$ is an average ADM of the frames within said window;
$ADM_{Group\ Avg}$ is an average ADM of the frames within said sequence;
X is a pre-defined percentage of the ADM;
Y and Z are multiplication factors; and
Tc is an absolute maximum shot boundary dissimilarity threshold.

3. The method of claim 2, wherein Y and Z are multiplication factors in a range between about 4 and about 6.

4. The method of claim 2, wherein Tc is an absolute maximum shot boundary dissimilarity threshold in a range between about 0.7 and about 0.9.

5. The method of claim 2, wherein X is about 50%.

6. The method of claim 2 wherein Y is about 4.

7. The method of claim 2, wherein Z is about 4.7.

8. The method of claim 2, wherein Tc is about 0.75.

9. The method of claim 2, wherein X is about 50%, Y is about 4, Z is about 4.7, and Tc is about 0.75.

* * * * *

UNITED STATES PATENT AND TRADEMARK OFFICE
CERTIFICATE OF CORRECTION

PATENT NO.         : 7,551,234 B2
APPLICATION NO. : 11/191458
DATED              : June 23, 2009
INVENTOR(S)        : Hui Zhou et al.

It is certified that error appears in the above-identified patent and that said Letters Patent is hereby corrected as shown below:

Column 14

Line 4, please change "Max threshold = min(Y * $ADM_{Group\ Avg}$, Tc)"

to --**Max_threshold = min(Y * $ADM_{Group\ Avg}$, Tc)**-- and;

Line 5, please change "Max threshold = min(Z * $ADM_{Frame\ Avg}$, Tc)"

to --**Max_threshold = min(Z * $ADM_{Frame\ Avg}$, Tc)**--.

Signed and Sealed this

First Day of September, 2009

David J. Kappos
*Director of the United States Patent and Trademark Office*